Nov. 11, 1958  H. FELLOWS  2,859,619
FLOW METERS
Filed Feb. 21, 1956  2 Sheets-Sheet 1

INVENTOR
HORACE FELLOWS
By [signature]
ATTORNEYS

Nov. 11, 1958     H. FELLOWS     2,859,619
FLOW METERS

Filed Feb. 21, 1956     2 Sheets-Sheet 2

INVENTOR
HORACE FELLOWS
ATTORNEYS

United States Patent Office 2,859,619
Patented Nov. 11, 1958

2,859,619

FLOW METERS

Horace Fellows, Wolverhampton, England, assignor to H. M. Hobson Limited, London, England, a company of Great Britain Application February 21, 1956, Serial No. 566,994

Claims priority, application Great Britain March 14, 1955

6 Claims. (Cl. 73—231)

This invention provides an arrangement whereby the division effected by a chain of electronic frequency dividers may be controlled electronically by periodically switching the signal input from the first to the second divider of the chain and back again.

One particular application of the invention is to a liquid flowmeter, such as that described in British Patent No. 752,496, comprising an electrical transmitter for emitting pulses at a frequency determined by the rate of flow of liquid to be measured, a counter, and a chain of electronic frequency dividers interposed between the transmitter and the counter. Such a flowmeter normally indicates volumetric flow only, but the present invention converts the flowmeter into one indicating mass flow.

The invention provides, in combination with the first two dividers of the chain, an oscillator arranged to supply an input signal to a control electrode of a thermionic valve, a relay in the anode circuit of the valve and arranged to connect a source of pulses to be divided to the first or to the second divider under control of the mark-space ratio (hereinafter defined) of the input signal to the valve, and means for varying said mark-space ratio and thereby the average division per second effected by the chain of dividers.

Preferably the dividers are binary dividers, and the division of the binary chain is then varied under control of the mark-space ratio of the input signal to the valve between $2^n$ and $2^{n-1}$.

The invention includes a liquid flowmeter, comprising an electrical transmitter for emitting pulses at a frequency determined by the rate of flow of liquid to be measured, a counter, a chain of electronic frequency dividers interposed between the transmitter and the counter, an oscillator arranged to supply an input signal to a control electrode of a thermionic valve, a relay in the anode circuit arranged to feed the pulses from the transmitter to the first or to the second divider under control of the mark-space ratio of the input signal to the valve, and means for varying in accordance with changes of density of the liquid the bias on the control electrode of the valve and thereby causing the counter to indicate the mass flow of liquid.

Two embodiments of the invention will now be described in more detail, by way of example, with reference to the accompanying diagrammatic drawings, in which.

Like reference characters indicate like parts throughout the figures.

Figure 1:
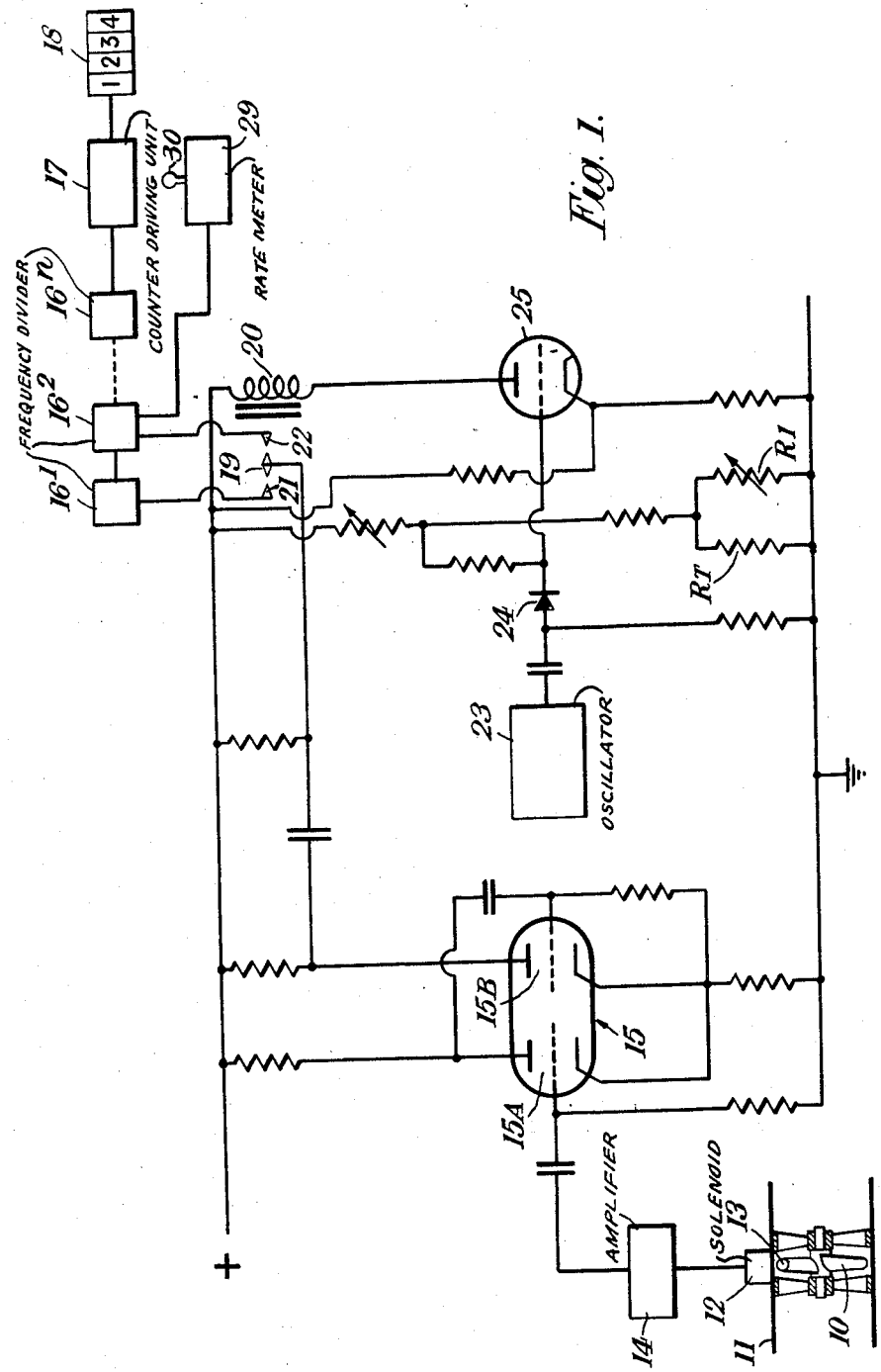
Fig. 1 shows the first embodiment of flowmeter.

The flowmeter is similar to that described in British Patent No. 752,496, and comprises, as shown in Fig. 1, a transmitter constituted by an impeller 10 mounted, within a tube 11 through which liquid (e. g. fuel) is flowing, for rotation about the axis of the conduit, and a cooperating solenoid 12 external to the conduit. The impeller has a magnet 13 affixed to one of its blades and generates electrical pulses in the solenoid at a rate determined by the rate of flow of liquid through the tube. The output of the solenoid 12 is passed, via an amplifier 14 and a shaper 15, to a chain of binary electronic dividers $16^1$, $16^2$ ... $16^n$, each constituted by a flip-flop of the Eccles-Jordan type, to the driving unit 17 of an electromechanical counter 18. The transmitter is normally so designed that each unit of flow to be measured, e. g. a gallon, causes the solenoid to generate $2^n$ pulses, where $2^n$ is the division effected by the binary dividing chain. The counter accordingly serves to count the number of gallons of fuel passing the transmitter, subject to correction as noted below for variations in the density of the fuel.

Figure 2:
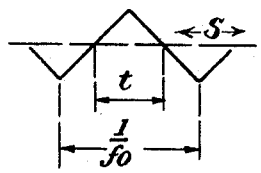
Fig. 2 shows the wave form of the signal input applied to the grid of the amplifier shown in Fig. 1.

The shaper 15 is constituted by a mono-stable flip-flop, the pulses from the amplifier being applied to the grid of the normally non-conducting section 15A and negative pulses from the anode of the normally conducting section 15B being applied to a switch contact 19, which is caused by an electromagnetic relay 20 to make contact alternately with contacts 21, 22 connected respectively to the first and second binary stages $16^1$, $16^2$ of the frequency divider chain. The switching is accomplished as follows:

The output of an oscillator 23, which may conveniently be of saw-tooth wave form, is clipped by a backed-off diode 24, the output of which is fed to the grid of a class AB amplifier 25. The relay 20 is disposed in the anode circuit of the amplifier 25 and connects the output of the shaper 15 to the first binary stage $16^1$ when the amplifier 25 is passing current and to the second binary stage $16^2$ when the amplifier 25 is not passing current. The mark-space ratio of the signal applied to the amplifier will accordingly determine the periods for which the binary chain will divide by $2^n$ and by $2^{n-1}$ respectively. As shown in Fig. 2, the mark time of the signal applied to the amplifier is $t$ and the space time is $s$. The mark time is the portion of each cycle of operation of the oscillator during which the signal is sufficiently positive to cause the amplifier 25 to pass current and the space time is the remainder of said cycle. The mark-space ratio is the ratio $t/s$.

The average division per second N, which is required to be equal to the number of impulses, S, from the transmitter per unit quantity of fuel, is $$N = S = t f_0 \, 2^n + (1 - f_0 t) \, 2^{n-1}$$

where $t$ is the mark time of grid signal (time during which division is $2^n$) and $f_0$ is the oscillator frequency.

The mark-space ratio of the input signal to the amplifier may be varied by manual adjustment of a resistor $R_1$ an may be so set as to cause an average binary division such that N is equal to S for any fuel passing through the flowmeter. $R_1$ is calibrated in terms of specific gravity of the liquid. A resistor $R_T$, sensitive to temperature and located in the fuel line 10, is connected in parallel with $R_1$ and automatically corrects N for change in temperature of the fuel.

It will be appreciated that, in response to a rise in temperature of the fuel, the resistance $R_T$ will increase, so rendering the grid of the amplifier 25 more positive. The mark-space ratio of the signal applied to the amplifier will therefore increase, so increasing the division by $2^n$ at the expense of the division by $2^{n-1}$ and consequently reducing the gravimetric indication given by the counter 18 to compensate for the reduced density of the fuel occasioned by the rise in temperature. When a fuel of higher specific gravity is to be passed through the flowmeter, the resistor $R_1$ is adjusted to render the grid of the amplifier 25 more negative.

Figure 3:
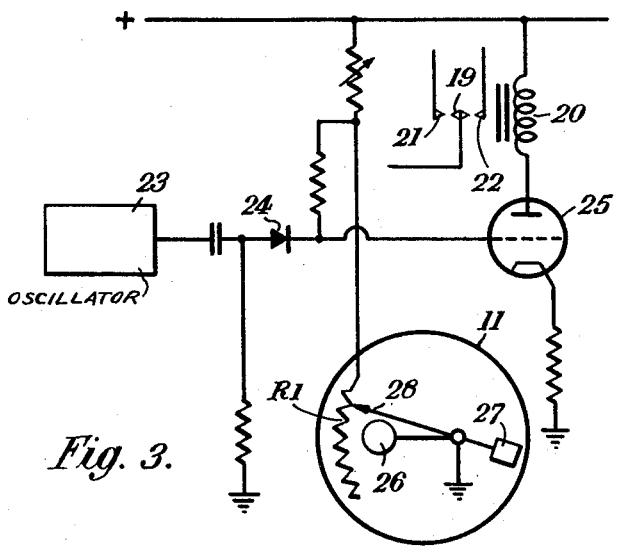
Fig. 3 shows a modification of the arrangement shown in Fig. 1.

In the embodiment shown in Fig. 3, automatic compensation for variations in specific gravity and temperature of the fuel is provided. In this case the resistor $R_T$ is dispensed with and the resistor $R_1$ is automatically adjusted in accordance with variations in density of the fuel under the control of a float 26 mounted in the tube 11. The float carries a counterweight 27 and a wiper 28 coacting with the resistor $R_1$.

If four magnets are used in the impeller, i. e. one per blade, the frequency of electrical impulses generated within the transmitter will be quadrupled for a unit quantity of fuel and two additional binary stages will be required in order to operate a standard indicator over the normal flow range.

These two binary stages $16^1$, $16^2$ will be selected by the relay 29 and the output-pulse frequency of the second binary stage $16^2$ will be sufficiently high to operate an instantaneous ratemeter 29, of the kind described in British Patent No. 752,496. By taking the ratemeter trigger pulses from a source which has been corrected for density, it is possible to compensate both the rate of consumption of fuel indicated on the meter 30 of the ratemeter 29 and the indication of reserve fuel given by the counter 18. The counter 18 is operated subtractively by the driving unit 17 and accordingly indicates at all times the quantity of fuel available for use.

While the invention has been primarily described with reference to its application to a flowmeter, it will be appreciated that it is of general application to variation in the average rate of division of a chain of electronic frequency dividers.

What I claim as my invention and desire to secure by Letters Patent is:

1. A liquid flowmeter, comprising an electrical transmitter for emitting pulses at a frequency determined by the rate of flow of liquid to be measured, a counter, a chain of electronic frequency dividers interposed between the transmitter and the counter, means connecting said transmitter to either a first or a second link in said chain of dividers, an oscillator connected to a control electrode of a thermionic valve, said control electrode having an adjustable bias, a relay in the anode circuit of said valve operating said connection means for feeding pulses from the transmitter to the first or to the second divider of said chain under control of the mark-space ratio of the input signal of the valve, and means for varying in accordance with changes of density of the liquid the bias on the control electrode of the valve and thereby causing the counter to indicate the mass flow of liquid.

2. A flowmeter according to claim 1, wherein the bias on the control electrode of the valve is controllable by two resistors in parallel, one of which is sensitive to temperature and exposed to the flow to be measured and the other of which is manually adjustable in accordance with variations in specific gravity of the liquid.

3. A flowmeter according to claim 1, wherein the bias on the control electrode of the valve is controllable by a resistor which is automatically varied in accordance with changes in density of the liquid under control of a float.

4. In combination with a counting device, a source of pulses, a chain of electronic frequency dividers connected to said counting device, means connecting said source of pulses to either a first or a second divider link in said chain, a thermionic valve having a control electrode, an oscillator connected to said control electrode and supplying an input signal thereto, a relay in the anode circuit of said valve and operating said connecting means between said first and second divider links for each cycle of operation of said valve, and means varying the mark-space ratio of the input signal of said valve and thereby the average division per second effected by the chain of dividers.

5. Apparatus as claimed in claim 4, in which the dividers are binary dividers.

6. Apparatus as claimed in claim 4, wherein the means for varying the mark-space ratio of the input signal to said valve comprises an adjustable bias resistor connected to the control electrode of said valve.

References Cited in the file of this patent
UNITED STATES PATENTS

| | | |
|---|---|---|
| 2,158,285 | Koch | May 16, 1939 |
| 2,385,725 | Pearson et al. | Sept. 25, 1945 |
| 2,609,686 | Peterson | Sept. 9, 1952 |
| 2,683,224 | Cole | July 6, 1954 |
| 2,741,917 | Piety et al. | Apr. 17, 1956 |
| 2,767,582 | Bartelink | Oct. 23, 1956 |

FOREIGN PATENTS

| | | |
|---|---|---|
| 1,109,332 | France | Sept. 21, 1955 |